(12) United States Patent
Kuramoto et al.

(10) Patent No.: US 10,240,637 B2
(45) Date of Patent: Mar. 26, 2019

(54) BEARING STRUCTURE

(71) Applicant: SUBARU CORPORATION, Tokyo (JP)

(72) Inventors: Yuya Kuramoto, Tokyo (JP); Tomoaki Sugiura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/814,039

(22) Filed: Nov. 15, 2017

(65) Prior Publication Data
US 2018/0180100 A1   Jun. 28, 2018

(30) Foreign Application Priority Data
Dec. 22, 2016   (JP) .................. 2016-249458

(51) Int. Cl.
| | |
|---|---|
| *F16C 33/76* | (2006.01) |
| *F16C 33/82* | (2006.01) |
| *F16C 33/78* | (2006.01) |
| *F16C 41/00* | (2006.01) |
| *F16C 35/063* | (2006.01) |
| *F16C 33/58* | (2006.01) |
| *F16C 33/66* | (2006.01) |

(Continued)

(52) U.S. Cl.
CPC .......... *F16C 33/7816* (2013.01); *F16C 19/52* (2013.01); *F16C 19/54* (2013.01); *F16C 33/583* (2013.01); *F16C 33/6681* (2013.01); *F16C 33/82* (2013.01); *F16C 35/063* (2013.01); *F16C 41/002* (2013.01)

(58) Field of Classification Search
CPC ........ F16C 19/08; F16C 19/18; F16C 19/181; F16C 19/182; F16C 19/183; F16C 19/184; F16C 19/52; F16C 19/54; F16C 19/33; F16C 19/6677; F16C 19/7816; F16C 19/7826; F16C 19/82; F16C 41/002; F16C 2380/26; H02K 5/161; H02K 5/1732; H02K 7/083; F16J 15/162
See application file for complete search history.

(56) References Cited

U.S. PATENT DOCUMENTS

| | | | |
|---|---|---|---|
| 8,961,030 B2 * | 2/2015 | Kirchhoff | ............. F16C 41/004 384/624 |
| 2015/0345549 A1 * | 12/2015 | Egbers | ................... F16C 19/06 384/489 |

FOREIGN PATENT DOCUMENTS

JP   2015-102200 A   6/2015

* cited by examiner

*Primary Examiner* — Phillip A Johnson
(74) *Attorney, Agent, or Firm* — Troutman Sanders LLP

(57) ABSTRACT

A bearing structure includes a shaft member coupled to a motor, two bearings on the shaft member with a distance therebetween in an axial direction, and a housing rotatable relative to the shaft member by means of the bearings, and an electrically-conductive seal member provided between the shaft member and the housing and abutting on the shaft member and the housing. The bearings include inner and outer rings fitted to an outer peripheral surface of the shaft member and an inner peripheral surface of the housing, respectively. The shaft member, housing, and seal member constitute an oil passage. At least one of an abutment portion where the seal member abuts on the shaft member or an abutment portion where the seal member abuts on the housing has a guide groove that guides oil entering the abutment portion from the oil passage to an external space of the oil passage.

17 Claims, 10 Drawing Sheets

(51) Int. Cl.
*F16C 19/52* (2006.01)
*F16C 19/54* (2006.01)

BEARING STRUCTURE

CROSS-REFERENCE TO RELATED APPLICATIONS

The present application claims priority from Japanese Patent Application No. 2016-249458 filed on Dec. 22, 2016, the entire contents of which are hereby incorporated by reference.

BACKGROUND

1. Technical Field

The present invention relates to bearing structures.

2. Related Art

In the related art, a driving system that operates by receiving a rotational driving force output from a motor as a power source is used in various types of devices. Specifically, in such a driving system, the rotational driving force output from the motor is transmitted via a shaft member. Normally, such a shaft member is rotatably supported by a bearing. In the shaft member directly or indirectly coupled to the motor, voltage may be generated due to high-frequency induction caused as a result of the motor being inverter-controlled. Thus, a potential difference occurs between an inner ring and an outer ring of the bearing that rotatably supports the shaft member. If the potential difference increases to an extent that dielectric breakdown may occur in an oil film inside the bearing, excessive electric current flows between the inner ring and the outer ring of the bearing, thus causing electrolytic corrosion to occur in the bearing. This may cause noise and vibration to occur in the bearing.

There has been proposed a technology for preventing electrolytic corrosion from occurring in a bearing. For instance, Japanese Unexamined Patent Application Publication (JP-A) No. 2015-102200 discloses a technology in which electrical conduction is achieved between the inner ring and the outer ring by providing a ring-shaped seal ring between the inner peripheral surface of the outer ring of the bearing and the outer peripheral surface of the inner ring. The seal ring fills an end opening of an inner space of the bearing in which a rolling member is disposed, and has an electrically-conductive elastic material that allows electrical conduction between the outer ring and the inner ring. According to this technology, electrical conduction is achieved between the inner ring and the outer ring of the bearing so that the potential difference between the inner ring and the outer ring is prevented from increasing, whereby excessive electric current can be prevented from flowing between the inner ring and the outer ring. Consequently, electrolytic corrosion can be prevented from occurring in the bearing.

In the technical field related to bearing structures, there are demands for more proposals of technologies for preventing electrolytic corrosion from occurring in bearings. For instance, in the technology disclosed in JP-A No. 2015-102200, the seal ring abuts on both the inner ring and the outer ring that rotate relative to each other, thus causing slide resistance to occur between the bearing and the seal ring. Since this causes the slide resistance to increase in the bearing structure, the power transmission efficiency may decrease. As a result, it is conceivably desirable that more technologies for preventing electrolytic corrosion from occurring in bearings be proposed.

SUMMARY OF THE INVENTION

It is desirable to provide a new and improved bearing structure that can effectively prevent electrolytic corrosion from occurring in a bearing.

An aspect of the present invention provides a bearing structure including a shaft member coupled to a motor, a pair of bearings disposed around the shaft member with a distance between the bearings in an axial direction, a housing rotatable relative to the shaft member by means of the pair of bearings, and an electrically-conductive seal member provided between the shaft member and the housing and abutting on the shaft member and the housing. Inner rings of the bearings are fitted to an outer peripheral surface of the shaft member. Outer rings of the bearings are fitted to an inner peripheral surface of the housing. The shaft member, the housing, and the seal member constitute an oil passage. At least one of an abutment portion where the seal member abuts on the shaft member or an abutment portion where the seal member abuts on the housing has a guide groove configured to guide oil entering the abutment portion from the oil passage to an external space of the oil passage.

DETAILED DESCRIPTION

A preferred example of the present invention will be described in detail below with reference to the appended drawings. In this description and the drawings, components having substantially identical functions and configurations are given the same reference signs, and redundant descriptions thereof are omitted.

1. Outline of Bearing Structure

Figure 1:
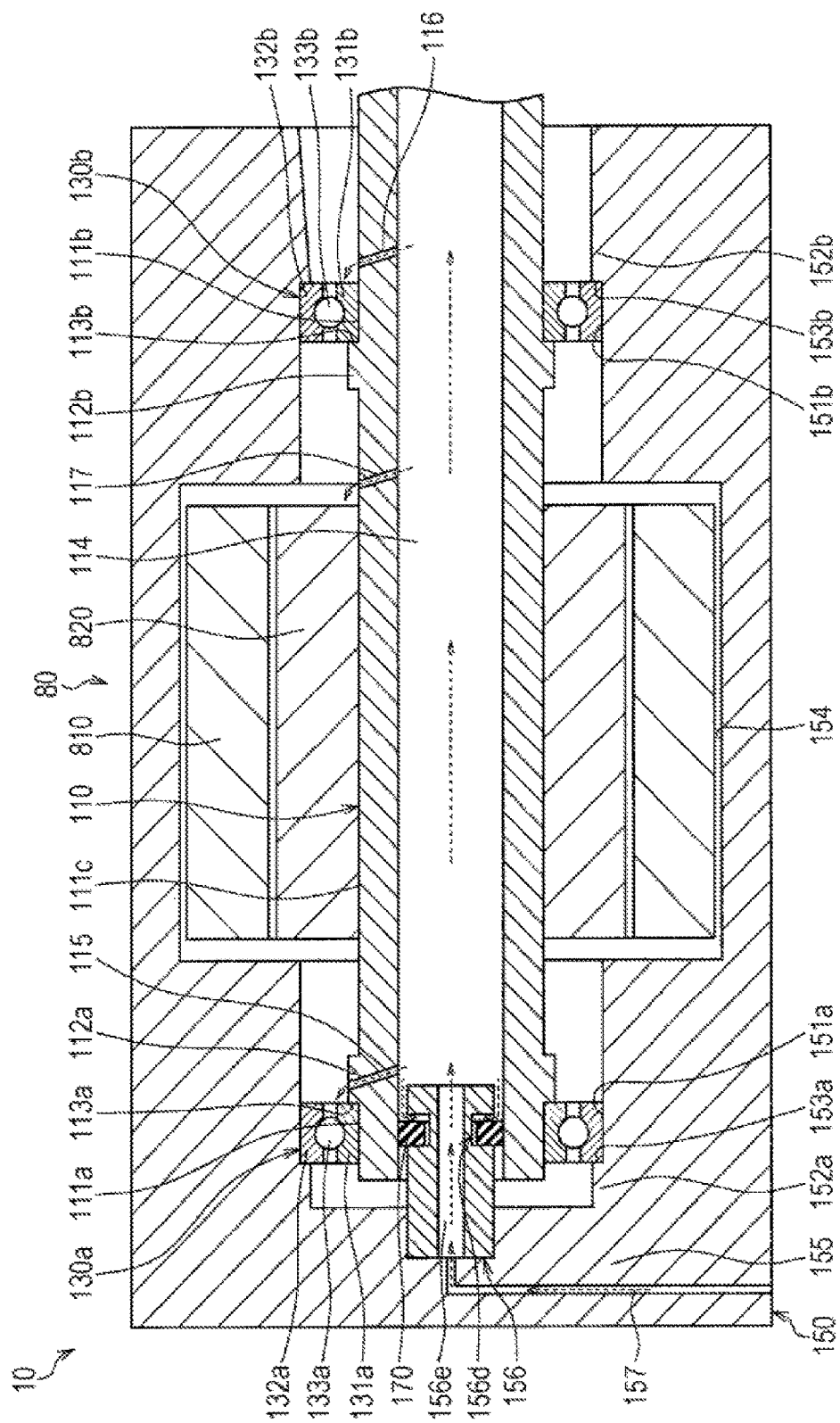
FIG. 1 is a cross-sectional view illustrating the configuration of a bearing structure according to an example of the present invention.

First, the outline of a bearing structure 10 according to an example of the present invention will be described with reference to FIG. 1. FIG. 1 is a cross-sectional view illustrating the configuration of the bearing structure 10 according to this example. Specifically, FIG. 1 is a cross-sectional view of a cross section including the central axis of a shaft member 110 in the bearing structure 10.

The bearing structure 10 rotatably supports the shaft member 110 coupled to a motor 80. The motor 80 is, for instance, a driving motor provided as a driving source that drives vehicle driving wheels in an electric vehicle (EV) or a hybrid electric vehicle (HEV). The bearing structure 10 is applicable to a driving system that operates by receiving a rotational driving force output from the motor 80 in such a vehicle. The above-described intended purpose of the motor 80 is merely an example, and the bearing structure 10 is applicable to driving systems with respect to motors for various purposes.

As illustrated in FIG. 1, the motor 80 includes a stator 810 and a rotor 820. For instance, the stator 810 and the rotor 820 are substantially cylindrical and face each other with a gap therebetween. The central axes of the stator 810 and the rotor 820 are substantially aligned.

The stator 810 is disposed at the outer peripheral side of the rotor 820 and is fixed to a housing 150, which will be described later. The stator 810 has a plurality of armatures disposed in the circumferential direction. Specifically, the stator 810 is provided with a core formed of a plurality of laminated copper plates and a coil wound through a plurality of slots provided at the inner periphery of the core, and the plurality of armatures are formed of the core and the coil. The coil of the stator 810 is electrically coupled to a battery via an inverter. The coil receives electric power so that a rotating magnetic field that rotates in the circumferential direction of the stator 810 is generated.

The rotor 820 has a plurality of permanent magnets disposed in the circumferential direction such that the polarity alternately varies. As described above, the stator 810 generates a rotating magnetic field so that a magnetic force acts on the permanent magnets of the rotor 820. Accordingly, the rotor 820 is rotatable relative to the stator 810. The motor 80 is driven by performing inverter control. Thus, the rotating speed of the rotor 820 is controlled. The shaft member 110 is fixed in a fitted state to the inner periphery of the rotor 820. Therefore, the shaft member 110 is coupled to the rotor 820 of the motor 80 so as to be rotatable together therewith. Accordingly, the shaft member 110 may be directly coupled to the motor 80. The shaft member 110 corresponds to an output shaft of the motor 80, which is directly rotationally driven by the motor 80. The shaft member 110 may be composed of, for instance, an iron-based material, such as cast iron.

As illustrated in FIG. 1, the bearing structure 10 includes the above-described shaft member 110, a pair of bearings 130a and 130b, and the housing 150. As illustrated in FIG. 1, the above-described motor 80 is accommodated within the housing 150, and the shaft member 110 is rotatably supported by the pair of bearings 130a and 130b. One side of the shaft member 110 (i.e., the left side in FIG. 1) relative to the motor 80 is accommodated within the housing 150, whereas the other side (i.e., the right side in FIG. 1) relative to the motor 80 extends outward from the housing 150. In the following description, the one side and the other side relative to the motor 80 may simply be referred to as "first side" and "second side", respectively. Although the second side of the shaft member 110 outside the housing 150 is not illustrated in detail in FIG. 1, the second side of the shaft member 110 is coupled to, for instance, another shaft member, constituting a driving system to which the bearing structure 10 is applied, via a mechanical component, such as a gear or a clutch.

Specifically, each of the bearings 130a and 130b is a rolling bearing including two bearing rings and rolling members interposed between the two bearing rings. For instance, each of the bearings 130a and 130b is a ball bearing including spherical rolling members. Alternatively, each of the bearings 130a and 130b may be a rolling bearing of a type different from a ball bearing. Specifically, the rolling members of each of the bearings 130a and 130b may have a shape, such as either one of a cylindrical shape and a conical shape.

For instance, as illustrated in FIG. 1, the bearings 130a and 130b respectively include inner rings 131a and 131b serving as inner bearing rings, outer rings 132a and 132b serving as outer bearing rings, and metallic rolling members 133a and 133b interposed between the inner rings 131a and 131b and the outer rings 132a and 132b. The inner rings 131a and 131b, the outer rings 132a and 132b, and the rolling members 133a and 133b may be composed of bearing steel, such as steel use journal (SUJ). The rolling members 133a and 133b are disposed in pluralities in the circumferential direction. When the inner rings 131a and 131b and the outer rings 132a and 132b rotate relative to each other, the pluralities of rolling members 133a and 133b rotate so that friction between components inside the bearings 130a and 130b is reduced.

Lubricating oil is injected into the bearings 130a and 130b, and the lubricating oil forms an oil film among the rolling members 133a and 133b, the inner rings 131a and 131b, and the outer rings 132a and 132b. Thus, friction between the components inside the bearings 130a and 130b is reduced. If the bearing 130a and the bearing 130b are not to be particularly distinguished from each other in the following description, they may simply be referred to as "bearings 130". Furthermore, if the inner ring 131a and the inner ring 131b are not to be particularly distinguished from each other, they may simply be referred to as "inner rings 131". Moreover, if the outer ring 132a and the outer ring 132b are not to be particularly distinguished from each other, they may simply be referred to as "outer rings 132".

The pair of bearings 130a and 130b are disposed around the shaft member 110 with a distance between the bearings 130a and 130b in the axial direction. The axial direction extends along the central axis of the shaft member 110. In the following description, such a direction may simply be referred to as "axial direction". The inner rings 131a and 131b of the bearings 130a and 130b are fitted to the outer peripheral surface of the shaft member 110. Specifically, in the bearing structure 10, the inner ring 131a of the bearing 130a is fitted to an outer peripheral surface 111a of an end at the first side of the shaft member 110. The inner ring 131b of the bearing 130b is fitted to an outer peripheral surface 111b at the second side of the shaft member 110. The rotor 820 of the motor 80 is fitted to an outer peripheral surface 111c at the center of the shaft member 110.

The shaft member 110 may be provided with extensions that extend radially outward from the outer peripheral surfaces fittable to the inner rings 131, so as to position the bearings 130 relative to the shaft member 110 in the axial direction. Specifically, an extension 112a that extends radially outward from the outer peripheral surface 111a may be provided at the first side of the shaft member 110. The extension 112a is located at the second side of the inner ring 131a, and an end surface 113a at the first side of the extension 112a abuts on an end surface at the second side of the inner ring 131a. An extension 112b that extends radially outward from the outer peripheral surface 111b may be provided at the second side of the shaft member 110. The extension 112b is located at the first side of the inner ring 131b, and an end surface 113b at the second side of the extension 112b abuts on an end surface at the first side of the inner ring 131b.

For instance, the shaft member 110 is substantially cylindrical. As will be described later, in the bearing structure 10 according to this example, an oil passage is constituted by the shaft member 110, the housing 150, and a seal member 170. The oil passage may include an inner peripheral space 114 of the shaft member 110.

The housing 150 accommodates various types of components. The housing 150 may be composed of, for instance, an aluminum alloy. Specifically, the housing 150 accommodates a portion of the shaft member 110, the pair of bearings 130a and 130b, and the motor 80. The end at the second side of the housing 150 may be provided with an opening to which the second side of the shaft member 110 is fitted. Furthermore, the center of the housing 150 may be provided with a recess 154 having a shape corresponding to the shape of the motor 80. Thus, the inner diameter of the housing 150 at the center thereof in the axial direction may be larger than other portions thereof. The end at the first side of the housing 150 may be provided with a base 155 that extends in a direction orthogonal to the axial direction. The first side of the inner space of the housing 150 is separated from the outside by the base 155.

The outer rings 132a and 132b of the bearings 130a and 130b are attached to the housing 150. Thus, the housing 150 is rotatable relative to the shaft member 110 by means of the pair of bearings 130a and 130b. Specifically, the outer rings 132a and 132b of the bearings 130a and 130b are fitted to the inner peripheral surface of the housing 150. More specifically, in the bearing structure 10, the outer ring 132a of the bearing 130a is fitted to an inner peripheral surface 151a at the first side of the housing 150. The outer ring 132b of the bearing 130b is fitted to an inner peripheral surface 151b at the second side of the housing 150.

The housing 150 may be provided with extensions that extend radially inward from the inner peripheral surfaces fittable to the outer rings 132, so as to position the bearings 130 relative to the housing 150 in the axial direction. Specifically, an extension 152a that extends radially inward from the inner peripheral surface 151a may be provided at the first side of the housing 150. The extension 152a is located at the first side of the outer ring 132a, and an end surface 153a at the second side of the extension 152a abuts on an end surface at the first side of the outer ring 132a. An extension 152b that extends radially inward from the inner peripheral surface 151b may be provided at the second side of the housing 150. The extension 152b is located at the second side of the outer ring 132b, and an end surface 153b at the first side of the extension 152b abuts on an end surface at the second side of the outer ring 132a.

As described above, the inner rings 131 of the bearings 130 are fitted to the outer peripheral surface of the shaft member 110, and the outer rings 132 of the bearings 130 are fitted to the inner peripheral surface of the housing 150. In the bearing structure 10, the fit between the inner rings 131 and the shaft member 110 and the fit between the outer rings 132 and the housing 150 may be set as appropriate. For instance, one of the bearing rings of the bearings 130 may be movable in the axial direction relative to the fittable component, whereas the other bearing ring of the bearings 130 may be restricted from moving in the axial direction relative to the fittable component. Specifically, the inner rings 131 may be fitted to the outer peripheral surface of the shaft member 110 in a loosely fitted state, whereas the outer rings 132 may be fitted to the inner peripheral surface of the housing 150 in a tightly fitted state. Alternatively, the inner rings 131 may be fitted to the outer peripheral surface of the shaft member 110 in a tightly fitted state, whereas the outer rings 132 may be fitted to the inner peripheral surface of the housing 150 in a loosely fitted state.

In a bearing structure that rotatably supports a shaft member, oil is sometimes used for lubrication between components and for cooling the components within the bearing structure. In such a case, the bearing structure is provided with an oil passage used for supplying the oil. In the bearing structure 10 according to this example, an oil passage is provided for, for instance, lubrication within the bearings 130 and cooling the motor 80. Specifically, in the bearing structure 10, the seal member 170 is provided between the shaft member 110 and the housing 150, and the oil passage is constituted by the shaft member 110, the housing 150, and the seal member 170. An example of the oil passage provided in the bearing structure 10 will be described below. In FIG. 1, the flow of oil is indicated by dashed arrows.

As illustrated in FIG. 1, for instance, in the bearing structure 10, the housing 150 includes a protruding member 156 that protrudes from the center toward the second side of the base 155. The protruding member 156 has its first side press-fitted to the base 155 so as to be secured to the base 155. The protruding member 156 extends in the axial direction of the shaft member 110, and the second side of the protruding member 156 faces the inner periphery of the shaft member 110 with a gap therebetween. The central axes of the protruding member 156 and the shaft member 110 may be substantially aligned. Accordingly, the protruding member 156 corresponds to an inner facing member that faces the inner periphery of the shaft member 110 with a gap therebetween. Thus, in this example, the housing 150 includes an inner facing member that faces the inner periphery of the shaft member 110 with a gap therebetween.

The protruding member 156 is substantially cylindrical, and an inner peripheral space 156e of the protruding member 156 extends therethrough from the first side toward the second side thereof. The base 155 of the housing 150 is provided with an inlet passage 157 through which oil delivered from an oil pan (not illustrated) where the oil is retained travels. The inlet passage 157 is coupled to the first side of the inner peripheral space 156e of the protruding member 156. Thus, the oil traveling through the inlet passage 157 is delivered to the inner peripheral space 156e of the protruding member 156. The second side of the inner peripheral space 156e of the protruding member 156 is coupled to the inner peripheral space 114 of the shaft member 110. Thus, the oil traveling through the inner peripheral space 156e of the protruding member 156 is supplied to the inner peripheral space 114 of the shaft member 110.

For instance, as illustrated in FIG. 1, the shaft member 110 is provided with communication passages 115, 116, and 117 that allow spatial communication between the inner peripheral side and the outer peripheral side. Thus, the oil supplied to the inner peripheral space 114 of the shaft member 110 is delivered to the communication passages 115, 116, and 117. Specifically, the communication passage 115 is provided near the bearing 130a so that the oil delivered to the communication passage 115 is ejected toward the bearing 130a. The communication passage 116 is provided near the bearing 130b so that the oil delivered to the communication passage 116 is ejected toward the bearing 130b. The communication passage 117 is provided near the motor 80 so that the oil delivered to the communication passage 117 is ejected toward the motor 80.

For instance, as described above, the bearing structure 10 is provided with the oil passage that includes the inlet passage 157 provided in the base 155, the inner peripheral space 156e of the protruding member 156, the inner peripheral space 114 of the shaft member 110, and the communication passages 115, 116, and 117. The bearing structure 10 is provided with such an oil passage so that lubrication within the bearings 130 and cooling of the motor 80 are achieved.

As described above, the oil passage provided in the bearing structure 10 includes the inner peripheral space 114 of the shaft member 110. Consequently, the oil can be supplied to components provided near the outer periphery of the shaft member 110. Furthermore, the oil travels through the inner peripheral space 114 so that heat exchange can be performed, via the shaft member 110, between the oil and the components fitted to the outer peripheral surface of the shaft member 110. According to this heat exchange, the components fitted to the outer peripheral surface of the shaft member 110 can be cooled.

The seal member 170 is provided between the shaft member 110 and the housing 150. The seal member 170 fills the gap between the shaft member 110 and the housing 150 so as to prevent the oil from leaking through the gap. For instance, the seal member 170 may be composed of either one of an iron-based material, such as cast iron, and resin. Specifically, the seal member 170 is ring-shaped.

The seal member 170 abuts on the shaft member 110 and the housing 150. Specifically, the seal member 170 abuts on the inner periphery of the shaft member 110 and the outer periphery of the protruding member 156 of the housing 150. For instance, an annular groove 156d is formed in an area that faces the inner periphery of the shaft member 110 at the second side of the outer periphery of the protruding member 156. The seal member 170 is fitted to the inner periphery of the shaft member 110 in a state where the seal member 170 is inserted in the annular groove 156d of the protruding member 156. Thus, the outer peripheral surface of the seal member 170 abuts on the inner peripheral surface of the shaft member 110, and the end surface at the first side of the seal member 170 abuts on the side surface at the first side of the annular groove 156d of the protruding member 156. Accordingly, the seal member 170 abuts on the shaft member 110 and the housing 150 so as to fill the gap between the shaft member 110 and the housing 150. Thus, the shaft member 110, the housing 150, and the seal member 170 constitute the aforementioned oil passage in the bearing structure 10. Components surrounding the seal member 170 will be described in detail later.

The seal member 170 according to this example has electrical conductivity. Thus, electrical conduction can be achieved between the shaft member 110 to which the inner rings 131 are fitted and the housing 150 to which the outer rings 132 are fitted. This can prevent an increase in the potential difference between the inner rings 131 and the outer rings 132, so that excessive electric current can be prevented from flowing between the inner rings 131 and the outer rings 132. Consequently, electrolytic corrosion can be prevented from occurring in the bearings 130.

Because the oil passage provided in the bearing structure 10 is supplied with oil pressure, the seal member 170 is pressed from the oil passage side. Therefore, the oil from the oil passage may enter the abutment sections of the seal member 170, which abut on the shaft member 110 and the housing 150, due to, for instance, partial elastic deformation of the seal member 170. In such a case, the oil may intervene between the seal member 170 and either one of the shaft member 110 and the housing 150. This may cause the contact area between the seal member 170 and either one of the shaft member 110 and the housing 150 to decrease, possibly causing the electrical conduction between the shaft member 110 and the housing 150 to become unstable.

With the seal member 170 according to this example, such unstable electrical conduction between the shaft member 110 and the housing 150 due to the oil entering the abutment portions can be prevented, so that electrolytic corrosion can be effectively prevented from occurring in the bearings 130. Such a seal member 170 will be described in detail below.

2. Seal Member

Figure 2:
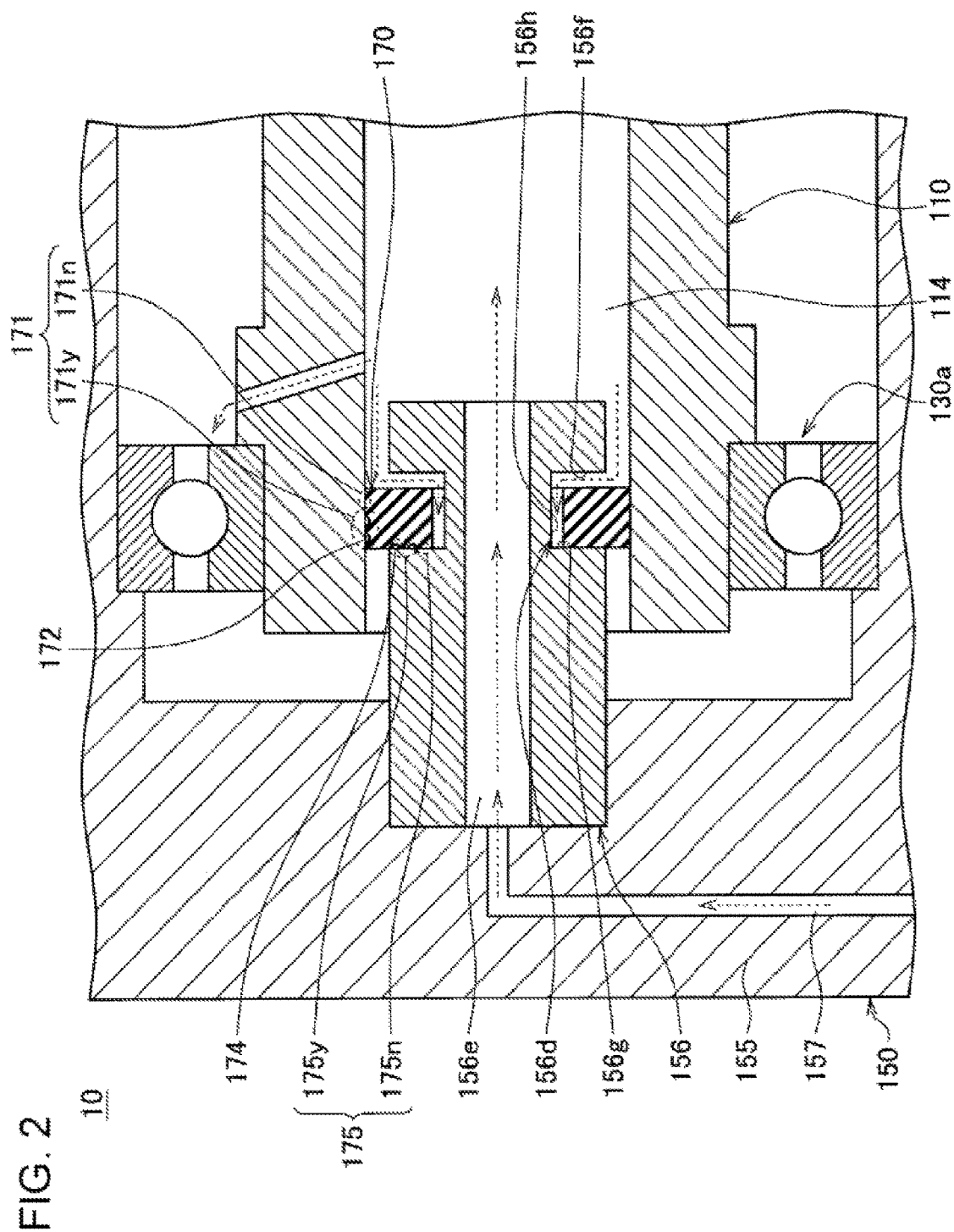
FIG. 2 is a partially-enlarged cross-sectional view illustrating the configuration of the bearing structure according to the example.
Figure 3:
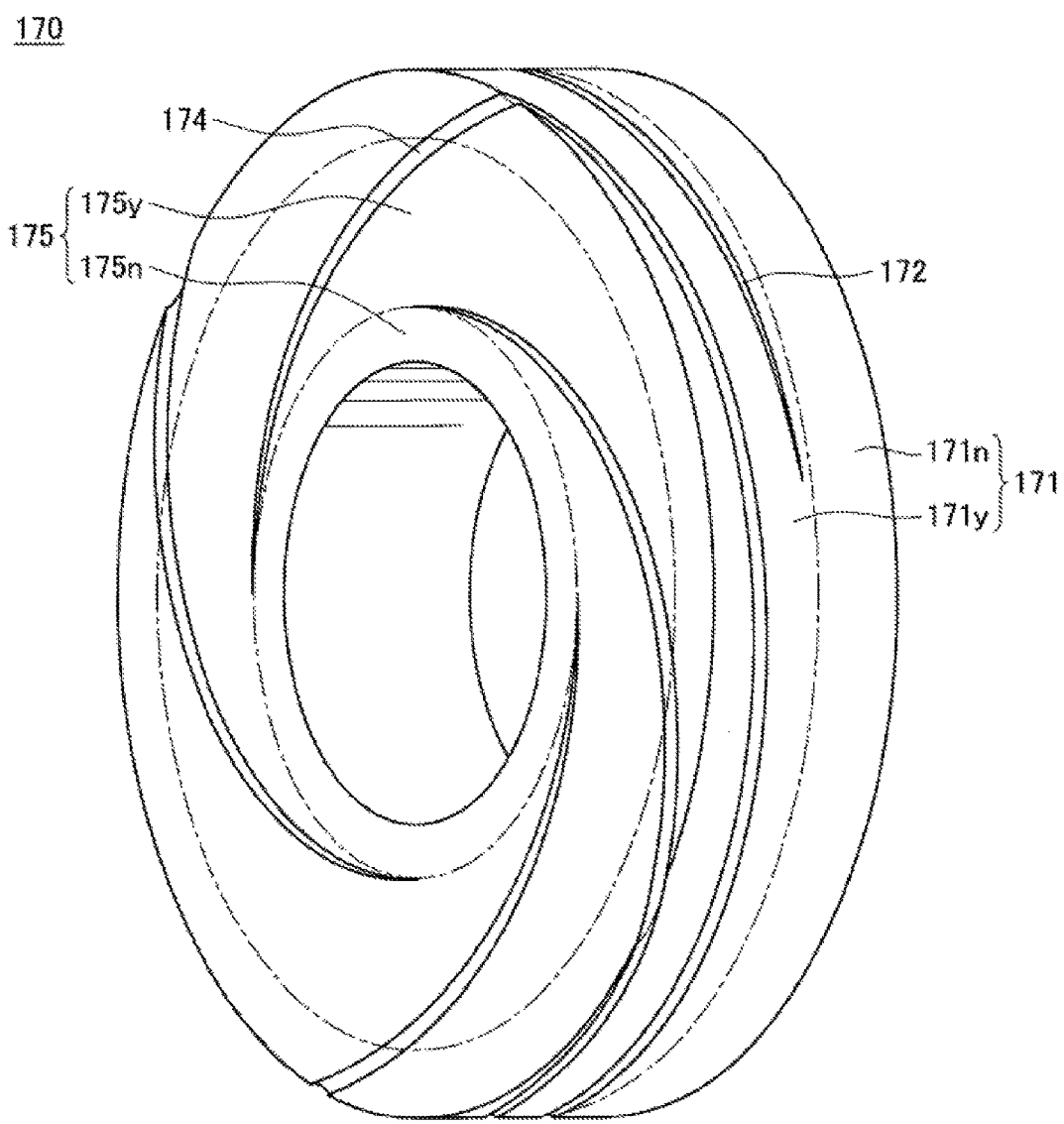
FIG. 3 is a perspective view illustrating a seal member according to the example.
Figure 4:
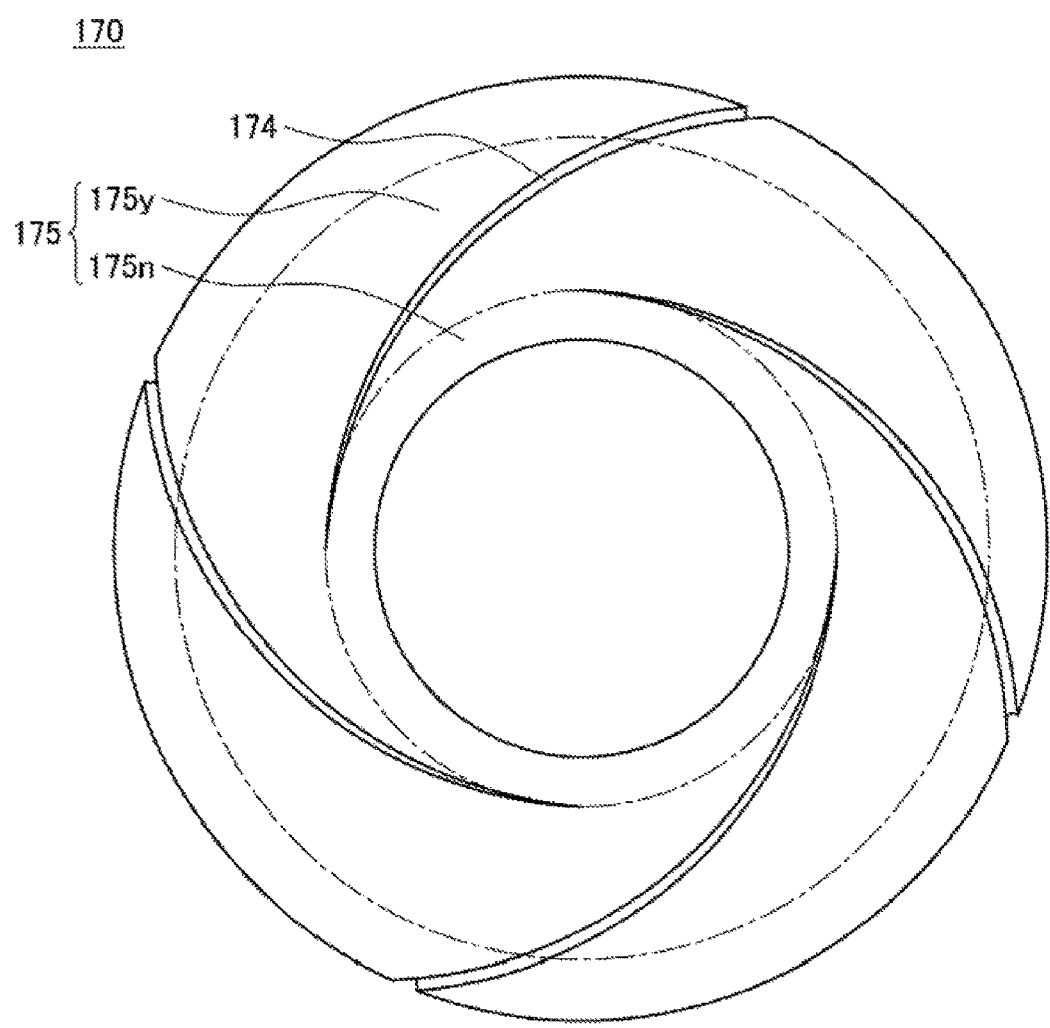
FIG. 4 is a front view illustrating the seal member according to the example.
Figure 5:
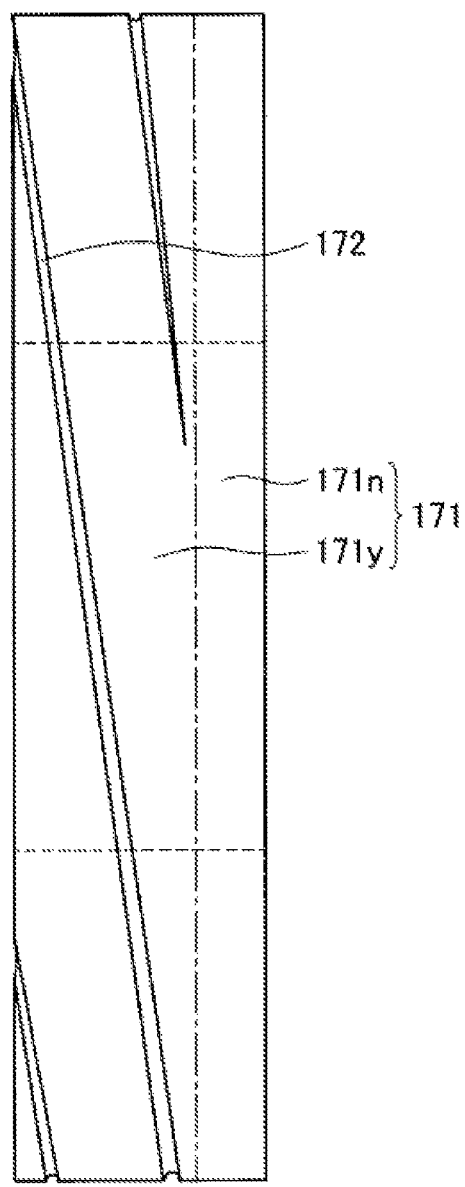
FIG. 5 is a side view illustrating the seal member according to the example.

Next, the seal member 170 according to this example will be described in detail with reference to FIGS. 2 to 5. FIG. 2 is a partially-enlarged cross-sectional view illustrating the configuration of the bearing structure 10 according to this example. Specifically, in FIG. 2, components surrounding the seal member 170 are illustrated. FIG. 3 is a perspective view illustrating the seal member 170 according to this example. In FIG. 2, the flow of oil is indicated by dashed arrows. Specifically, FIG. 3 is a perspective view of the seal member 170 as viewed from the first side thereof. FIG. 4 is a front view illustrating the seal member 170 according to this example. Specifically, FIG. 4 is a front view of the seal member 170 as viewed from the first side thereof. FIG. 5 is a side view illustrating the seal member 170 according to this example.

As described above, for instance, as illustrated in FIG. 2, the seal member 170 is fitted to the inner periphery of the shaft member 110 in a state where the seal member 170 is inserted in the annular groove 156d of the protruding member 156. The inner diameter of the seal member 170 is larger than the outer diameter of a base 156h of the annular groove 156d, and the outer diameter of the seal member 170 substantially matches the inner diameter of the shaft member 110. The thickness of the seal member 170 is smaller than the width of the annular groove 156d in the axial direction.

The oil delivered to the inner peripheral space 114 of the shaft member 110 is introduced to the space between the end surface at the second side of the seal member 170 and a side surface 156f at the second side of the annular groove 156d and also to the space between the inner peripheral surface of the seal member 170 and the outer peripheral surface of the base 156h of the annular groove 156d. Thus, oil pressure is supplied to the inner peripheral space 114 of the shaft member 110 so that the seal member 170 is pressed toward the outer periphery and toward the first side. Consequently, as illustrated in FIG. 2, the outer peripheral surface of the seal member 170 abuts on an inner peripheral surface of the shaft member 110, and the end surface at the first side of the seal member 170 abuts on a side surface 156g at the first side of the annular groove 156d of the protruding member 156.

As described above, the seal member 170 abuts on the shaft member 110 and the housing 150. In the following description, areas of the seal member 170 that abut on the shaft member 110 and the housing 150 will be referred to as "abutment portions". Specifically, the outer peripheral surface of the seal member 170 corresponds to an abutment portion 171 where the seal member 170 abuts on the shaft member 110. An area of the end surface at the first side of the seal member 170 that abuts on the side surface 156g at the first side of the annular groove 156d corresponds to an abutment portion 175 where the seal member 170 abuts on the housing 150.

The dimensions of the seal member 170 in a state where it is not supplied with oil pressure are not particularly limited. For instance, in a state where the seal member 170 is not supplied with oil pressure, the outer diameter of the seal member 170 does not have to substantially match the inner diameter of the shaft member 110. When the seal member 170 is pressed toward the outer periphery and toward the first side by being supplied with oil pressure, the seal member 170 may deform due to, for instance, elastic deformation. Furthermore, when the seal member 170 is pressed toward the outer periphery and toward the first side by being supplied with oil pressure, the seal member 170 may be deformable not due to elastic deformation.

At least one of the abutment portion 171 where the seal member 170 according to this example abuts on the shaft member 110 or the abutment portion 175 where the seal member 170 abuts on the housing 150 has a guide groove. The guide groove guides the oil entering the abutment portions from the oil passage to a space outside the oil passage. The space outside the oil passage is a space separated from the oil passage by the seal member 170, and such a space may also be simply referred to as "external space" hereinafter.

It is preferable that both the abutment portion 171 abutting on the shaft member 110 and the abutment portion 175 abutting on the housing 150 have guide grooves. Specifically, as illustrated in FIGS. 2 to 5, the abutment portion 171 abutting on the shaft member 110 has a guide groove 172, and the abutment portion 175 abutting on the housing 150 has a guide groove 174. For instance, as illustrated in FIGS. 3 to 5, the guide groove 172 and the guide groove 174 may be helical about the central axis of the seal member 170. In other words, the guide groove 172 and the guide groove 174 may be inclined relative to the circumferential direction. Although the guide groove 172 and the guide groove 174 are each formed in a plurality in FIGS. 3 to 5, the number of guide grooves 172 and the number of guide grooves 174 are not particularly limited. For instance, the number of guide grooves 172 and the number of guide grooves 174 do not have to be plural.

Specifically, the guide grooves are formed on the external space side of the abutment portions of the seal member 170. In the following description, a region in each abutment portion where a guide groove is formed will be referred to as "formation region" hereinafter. More specifically, as illustrated in FIGS. 2 to 5, the first side of the abutment portion 171 abutting on the shaft member 110 is provided with a formation region 171y, and the guide groove 172 is formed in this formation region 171y. The outer peripheral side of the abutment portion 175 abutting on the housing 150 is provided with a formation region 175y, and the guide groove 174 is formed in this formation region 175y.

The oil passage side of each abutment portion of the seal member 170 is provided with a non-formation region serving as a region where a guide groove is not formed. Specifically, as illustrated in FIGS. 2 to 5, the second side of the abutment portion 171 abutting on the shaft member 110 is provided with a non-formation region 171n where the guide groove 172 is not formed. The inner peripheral side of the abutment portion 175 abutting on the housing 150 is provided with a non-formation region 175n where the guide groove 174 is not formed. In FIGS. 3 to 5, the formation regions and the non-formation regions are indicated by single-dot chain lines.

Accordingly, the abutment portions of the seal member 170 are provided with the non-formation regions where guide grooves are not formed so that the contact properties between each abutment portion and either one of the shaft member 110 and the housing 150 can be improved. Thus, the oil can be effectively prevented from leaking from the oil passage. Moreover, the abutment portions are provided with the formation regions, where the guide grooves are formed, at the external space side of the non-formation regions, so that the oil entering the abutment portions from the oil passage can be specifically guided to the external space.

Specifically, the guide grooves are formed in the formation regions of the abutment portions so as to allow spatial communication between the ends at the oil passage side and the ends at the external space side. More specifically, as illustrated in FIGS. 3 and 5, the guide groove 172 extends from the end at the second side toward the end at the first side in the formation region 171y of the abutment portion 171 abutting on the shaft member 110. Furthermore, as illustrated in FIGS. 3 and 4, the guide groove 174 extends from the end at the inner peripheral side in the formation region 175y of the abutment portion 175 abutting on the housing 150 toward the outer periphery of the end surface at the first side of the seal member 170. In the end surface at the first side of the seal member 170, the guide groove 174 does not have to be formed at the outer peripheral side of the abutment portion 175. Furthermore, although the guide groove 172 and the guide groove 174 are illustrated in FIG. 3 as being coupled to each other at the outer periphery of the end surface at the first side of the seal member 170, the guide groove 172 and the guide groove 174 do not have to be coupled to each other.

Accordingly, the guide grooves are formed in the formation regions of the abutment portions so as to allow spatial communication between the ends at the oil passage side and the ends at the external space side, whereby the oil entering the abutment portions from the oil passage can be effectively guided to the external space of the oil passage. Thus, even if the oil enters the abutment portions, the oil is effectively prevented from intervening between the seal member 170 and either one of the shaft member 110 and the housing 150.

Furthermore, in each abutment portion of the seal member 170, a guide groove may be disposed at each position in the circumferential direction between the end at the oil passage side and the end at the external space side. Specifically, as illustrated in FIGS. 3 and 5, in the abutment portion 171 abutting on the shaft member 110, a guide groove 172 is disposed at each position in the circumferential direction between the end at the second side and the end at the first side. Moreover, as illustrated in FIGS. 3 and 4, in the abutment portion 175 abutting on the housing 150, a guide groove 174 is disposed at each position in the circumferential direction between the end at the inner peripheral side and the end at the outer peripheral side.

Accordingly, in each abutment portion of the seal member 170, a guide groove is disposed at each position in the circumferential direction between the end at the oil passage side and the end at the external space side, so that the oil entering the abutment portion can be more reliably guided to the external space of the oil passage regardless of the position, in the circumferential direction, at which the oil enters the abutment portion. Thus, even if the oil enters any of the abutment portions, the oil can be more effectively prevented from intervening between the seal member 170 and either one of the shaft member 110 and the housing 150.

The seal member 170 preferably has abrasion resistance. The shaft member 110 and the housing 150 that abut on the seal member 170 may rotate relative to each other. Thus, the seal member 170 may rotate relative to at least one of the shaft member 110 or the housing 150. The rotation of the seal member 170 relative to either one of the shaft member 110 and the housing 150 depends on the magnitude relationship of the friction resistance between the seal member 170 and the shaft member 110 and the magnitude relationship of the friction resistance between the seal member 170 and the housing 150. Thus, the seal member 170 may slide relative to another component on which the seal member 170 abuts. Therefore, with the seal member 170 having abrasion resistance, breakage of the seal member 170 caused by friction with another component on which the seal member 170 abuts can be suppressed.

Furthermore, the seal member 170 preferably has oil resistance. Together with the shaft member 110 and the housing 150, the seal member 170 constitutes the oil passage. Thus, the portion at the oil passage side of the seal member 170 is immersed in the oil within the oil passage. Because the oil entering each abutment portion is guided toward the external space, the oil may come into contact with a portion different from the portion of the seal member 170 immersed in the oil within the oil passage. Therefore, with the seal member 170 having oil resistance, a change in the properties of the seal member 170 caused by coming into contact with the oil can be suppressed.

As described above, the seal member 170 according to this example has electrical conductivity. Thus, electrical conduction can be achieved between the shaft member 110 to which the inner rings 131 are fitted and the housing 150 to which the outer rings 132 are fitted. This can prevent an increase in the potential difference between the inner rings 131 and the outer rings 132, so that excessive electric current can be prevented from flowing between the inner rings 131 and the outer rings 132. Consequently, electrolytic corrosion can be prevented from occurring in the bearings 130.

As described above, in the seal member 170 according to this example, at least one of the abutment portion 171 abutting on the shaft member 110 or the abutment portion 175 abutting on the housing 150 has a guide groove that guides the oil entering the abutment portion from the oil passage to the external space of the oil passage. Thus, even if the oil enters the abutment portion, the oil is effectively prevented from intervening between the seal member 170 and either one of the shaft member 110 and the housing 150. This can prevent the contact area between the seal member 170 and either one of the shaft member 110 and the housing 150 from decreasing, so that stable electrical conduction between the shaft member 110 and the housing 150 can be ensured. Consequently, according to this example, electrolytic corrosion can be effectively prevented from occurring in the bearings 130.

As described above, in a bearing structure that rotatably supports a shaft member coupled to a motor, as in the bearing structure 10 according to this example, an oil passage is sometimes provided for lubrication between components and for cooling the components. In this example, an electrically-conductive member is used as a seal member provided for constituting such an oil passage, so that the occurrence of electrolytic corrosion is prevented.

Consequently, the slide resistance in the bearing structure can be prevented from increasing, so that the power transmission efficiency can be prevented from decreasing.

3. Modifications

Next, various modifications will be described.

3.1. First Modification

Figure 6:
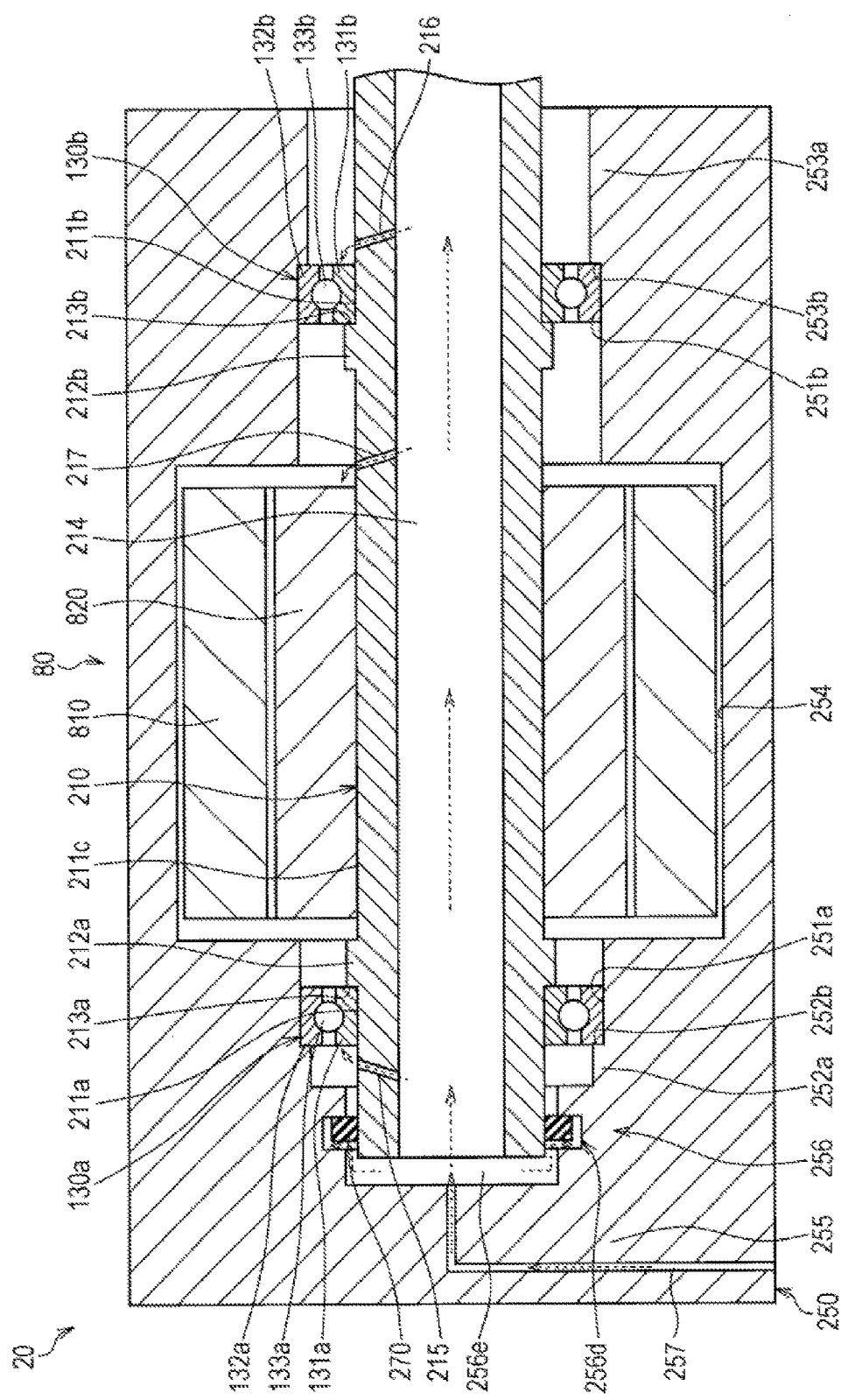
FIG. 6 is a cross-sectional view illustrating the configuration of a bearing structure according to a first modification.
Figure 7:
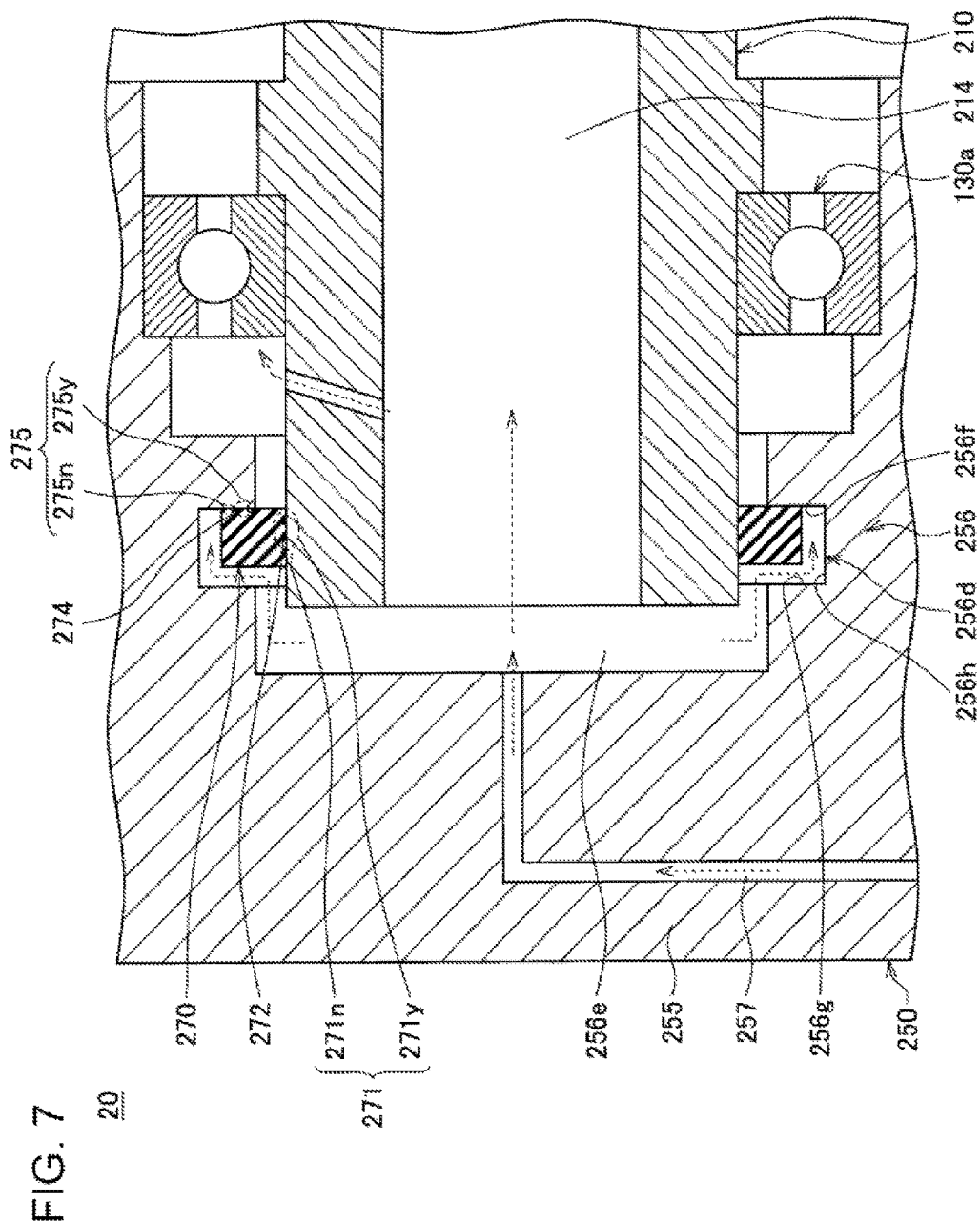
FIG. 7 is a partially-enlarged cross-sectional view illustrating the configuration of the bearing structure according to the first modification.

First, a first modification will be described with reference to FIGS. 6 and 7. FIG. 6 is a cross-sectional view illustrating the configuration of a bearing structure 20 according to the first modification. Specifically, FIG. 6 is a cross-sectional view of a cross section including the central axis of a shaft member 210 in the bearing structure 20. FIG. 7 is a partially-enlarged cross-sectional view illustrating the configuration of the bearing structure 20 according to the first modification. Specifically, in FIG. 7, components surrounding a seal member 270 are illustrated.

In the first modification, the positional relationship among the shaft member, the housing, and the seal member is different from that in the example described with reference to FIGS. 1 to 5. Specifically, the first modification is different from the above-described example in that a housing 250 includes an outer facing member that faces the outer periphery of the shaft member 210 with a gap therebetween, and that the seal member 270 abuts on the inner periphery of the outer facing member and the outer periphery of the shaft member 210.

As illustrated in FIG. 6, the bearing structure 20 according to the first modification includes the shaft member 210, a pair of bearings 130a and 130b, and the housing 250.

The shaft member 210 is similar to the shaft member 110 according to the above-described example in being fixed in a fitted state to the inner periphery of the rotor 820 of the motor 80 and being rotatable together with the rotor 820. The shaft member 210 is rotatably supported by the pair of bearings 130a and 130b. The first side of the shaft member 210 is accommodated within the housing 250, whereas the second side extends outward from the housing 250. The inner ring 131a of the bearing 130a is fitted to an outer peripheral surface 211a at the first side of the shaft member 210. The inner ring 131b of the bearing 130b is fitted to an outer peripheral surface 211b at the second side of the shaft member 210. The rotor 820 of the motor 80 is fitted to an outer peripheral surface 211c at the center of the shaft member 210.

An extension 212a that extends radially outward from the outer peripheral surface 211a is provided at the first side of the shaft member 210, and an end surface 213a at the first side of the extension 212a abuts on an end surface at the second side of the inner ring 131a. An extension 212b that extends radially outward from the outer peripheral surface 211b is provided at the second side of the shaft member 210, and an end surface 213b at the second side of the extension 212b abuts on an end surface at the first side of the inner ring 131b.

For instance, the shaft member 210 is substantially cylindrical. As will be described later, in the bearing structure 20 according to the first modification, an oil passage is constituted by the shaft member 210, the housing 250, and the seal member 270. The oil passage may include an inner peripheral space 214 of the shaft member 210.

Similar to the housing 150 according to the above-described example, the housing 250 accommodates a portion of the shaft member 210, the pair of bearings 130a and 130b, and the motor 80. The end at the second side of the housing 250 may be provided with an opening in which the second side of the shaft member shaft member 210 is fitted. Furthermore, the center of the housing 250 may be provided with a recess 254 having a shape corresponding to the shape of the motor 80. Thus, the inner diameter of the housing 250 at the center thereof in the axial direction may be larger than other portions thereof. The end at the first side of the housing 250 may be provided with a base 255 that extends in a direction orthogonal to the axial direction. The first side of the inner space of the housing 250 is separated from the outside by the base 255.

The outer rings 132*a* and 132*b* of the bearings 130*a* and 130*b* are attached to the housing 250. Thus, the housing 250 is rotatable relative to the shaft member 210 by means of the pair of bearings 130*a* and 130*b*. In the bearing structure 20, the outer ring 132*a* of the bearing 130*a* is fitted to an inner peripheral surface 251*a* at the first side of the housing 250. The outer ring 132*b* of the bearing 130*b* is fitted to an inner peripheral surface 251*b* at the second side of the housing 250.

An extension 252*a* that extends radially inward from the inner peripheral surface 251*a* is provided at the first side of the housing 250, and an end surface 253*a* at the second side of the extension 252*a* abuts on an end surface at the first side of the outer ring 132*a*. An extension 252*b* that extends radially inward from the inner peripheral surface 251*b* is provided at the second side of the housing 250, and an end surface 253*b* at the first side of the extension 252*b* abuts on an end surface at the second side of the outer ring 132*b*.

Similar to the bearing structure 10 according to the above-described example, the bearing structure 20 according to the first modification is provided with an oil passage for lubrication within the bearings 130 and for cooling the motor 80. Specifically, in the bearing structure 20, the seal member 270 is provided between the shaft member 210 and the housing 250, and the oil passage is constituted by the shaft member 210, the housing 250, and the seal member 270. In the bearing structure 20 according to the first modification, the configuration of the oil passage is different from that in the bearing structure 10 according to the above-described example due to a different positional relationship among the shaft member 210, the housing 250, the seal member 270. An example of the oil passage provided in the bearing structure 20 will be described below. In FIG. 6, the flow of oil is indicated by dashed arrows.

As illustrated in FIG. 6, for instance, in the bearing structure 20, the housing 250 includes an adjoining portion 256 that is provided between the extension 252*a* at the first side and the base 255 and that is closer to the shaft member 210 in the radial direction than the extension 252*a*. The adjoining portion 256 has an inner diameter smaller than that of the extension 252*a*. The first side of the adjoining portion 256 extends in the axial direction from the base 255, whereas the second side of the adjoining portion 256 extends radially inward from the extension 252*a*. The second side of such an adjoining portion 256 faces the outer periphery of the shaft member 210 with a gap therebetween. The central axes of the adjoining portion 256 and the shaft member 210 are substantially aligned. Accordingly, the adjoining portion 256 corresponds to an outer facing member that faces the outer periphery of the shaft member 210 with a gap therebetween. Thus, in the first modification, the housing 250 includes an outer facing member that faces the outer periphery of the shaft member 210 with a gap therebetween.

The base 255 of the housing 250 is provided with an inlet passage 257 through which oil delivered from an oil pan (not illustrated) where the oil is retained travels. The inlet passage 257 is coupled to the center of the end surface at the second side of the base 255. Thus, the oil traveling through the inlet passage 257 is delivered from an opening at the center of the end surface at the second side of the base 255 to an inner peripheral space 256*e* at the first side of the adjoining portion 256. The inner peripheral space 256*e* at the first side of the adjoining portion 256 corresponds to a space near the base 255 in the inner space of the housing 250. Because the end at the first side of the shaft member 210 faces the base 255, the inner peripheral space 256*e* at the first side of the adjoining portion 256 is coupled to the inner peripheral space 214 of the shaft member 210. Consequently, the oil traveling through the inner peripheral space 256*e* at the first side of the adjoining portion 256 is supplied to the inner peripheral space 214 of the shaft member 210.

Similar to the shaft member 110 according to the above-described example, the shaft member 210 is provided with communication passages 215, 216, and 217 that allow spatial communication between the inner peripheral side and the outer peripheral side. Thus, the oil supplied to the inner peripheral space 214 of the shaft member 210 is delivered to the communication passages 215, 216, and 217. Specifically, the communication passage 215 is provided near the bearing 130*a* so that the oil delivered to the communication passage 215 is ejected toward the bearing 130*a*. The communication passage 216 is provided near the bearing 130*b* so that the oil delivered to the communication passage 216 is ejected toward the bearing 130*b*. The communication passage 217 is provided near the motor 80 so that the oil delivered to the communication passage 217 is ejected toward the motor 80.

For instance, as described above, the bearing structure 20 is provided with the oil passage that includes the inlet passage 257 provided in the base 255, the inner peripheral space 256*e* at the first side of the adjoining portion 256, the inner peripheral space 214 of the shaft member 210, and the communication passages 215, 216, and 217. The bearing structure 20 is provided with such an oil passage so that lubrication within the bearings 130 and cooling of the motor 80 are achieved.

Similar to the bearing structure 10 according to the above-described example, the seal member 270 is provided between the shaft member 210 and the housing 250. For instance, the seal member 270 may be composed of either one of an iron-based material, such as cast iron, and resin. Specifically, the seal member 270 is ring-shaped. The seal member 270 and components surrounding the seal member 270 will be described in detail below with reference to FIG. 7. In FIG. 7, the flow of oil is indicated by dashed arrows.

Unlike the seal member 170 according to the above-described example, the seal member 270 according to the first modification abuts on the outer periphery of the shaft member 210 and the inner periphery of the adjoining portion 256 of the housing 250. For instance, as illustrated in FIG. 7, an annular groove 256*d* is formed in an area that faces the outer periphery of the shaft member 210 at the second side of the inner periphery of the adjoining portion 256. The seal member 270 is fitted to the outer periphery of the shaft member 210 in a state where the seal member 270 is inserted in the annular groove 256*d* of the adjoining portion 256. The outer diameter of the seal member 270 is smaller than the inner diameter of a base 256*h* of the annular groove 256*d*, and the inner diameter of the seal member 270 substantially matches the outer diameter of the shaft member 210. The thickness of the seal member 270 is smaller than the width of the annular groove 256*d* in the axial direction.

The oil delivered to the inner peripheral space 256*e* at the first side of the adjoining portion 256 is introduced to the space between the end surface at the first side of the seal member 270 and an end surface 256*g* at the first side of the annular groove 256*d* and also to the space between the outer peripheral surface of the seal member 270 and the inner peripheral surface of the base 256*h* of the annular groove 256d. Thus, oil pressure is supplied to the inner peripheral space 256e at the first side of the adjoining portion 256 so that the seal member 270 is pressed toward the inner periphery and the second side. Consequently, as illustrated in FIG. 7, the inner peripheral surface of the seal member 270 abuts on the outer peripheral surface 211a of the shaft member 210, and the end surface at the second side of the seal member 270 abuts on a side surface 256f at the second side of the annular groove 256d of the adjoining portion 256.

As described above, the seal member 270 abuts on the shaft member 210 and the housing 250. The inner peripheral surface of the seal member 270 corresponds to an abutment portion 271 where the seal member 270 abuts on the shaft member 210. An area of the end surface at the second side of the seal member 270 that abuts on the side surface 256f at the second side of the annular groove 256d corresponds to an abutment portion 275 where the seal member 270 abuts on the housing 250.

In the seal member 270 according to the first modification, at least one of the abutment portion 271 abutting on the shaft member 210 or the abutment portion 275 abutting on the housing 250 has a guide groove, similar to the seal member 170 according to the above-described example. Specifically, the guide groove is formed at the external space side of the abutment portion of the seal member 270, and the oil passage side of the abutment portion of the seal member 270 is provided with a non-formation region where the guide groove is not formed.

More specifically, as illustrated in FIG. 7, the second side of the abutment portion 271 abutting on the shaft member 210 is provided with a formation region 271y, and a guide groove 272 is formed in this formation region 171y. The first side of the abutment portion 271 abutting on the shaft member 210 is provided with a non-formation region 271n where the guide groove 272 is not formed. The inner peripheral side of the abutment portion 275 abutting on the housing 250 is provided with a formation region 275y, and a guide groove 274 is formed in this formation region 275y. The outer peripheral side of the abutment portion 275 abutting on the housing 250 is provided with a non-formation region 275n where the guide groove 274 is not formed. For instance, the guide groove 272 and the guide groove 274 may be helical about the central axis of the seal member 270, similar to the seal member 170 according to the above-described example.

Similar to the seal member 170 according to the above-described example, the seal member 270 according to the first modification has electrical conductivity. Thus, electrical conduction can be achieved between the shaft member 210 to which the inner rings 131 are fitted and the housing 250 to which the outer rings 132 are fitted, whereby electrolytic corrosion can be prevented from occurring in the bearings 130.

In the seal member 270 according to the first modification, at least one of the abutment portion 271 abutting on the shaft member 210 or the abutment portion 275 abutting on the housing 250 has a guide groove that guides the oil entering the abutment portions from the oil passage to the external space of the oil passage, similar to the seal member 170 according to the above-described example. Thus, even if the oil enters the abutment portions, the oil can be prevented from intervening between the seal member 270 and either one of the shaft member 210 and the housing 250. This can prevent the contact area between the seal member 270 and either one of the shaft member 210 and the housing 250 from decreasing, so that stable electrical conduction between the shaft member 210 and the housing 250 can be ensured.

Consequently, according to the first modification, electrolytic corrosion can be effectively prevented from occurring in the bearings 130, similar to the above-described example.

As described above, the positional relationship among the shaft member, the housing, and the seal member is not limited to the positional relationship in the bearing structure 10 according to the above-described example. Specifically, the shaft member, the housing, and the seal member may have a different positional relationship so long as a seal member abutting on the shaft member and the housing is provided between the shaft member and the housing and an oil passage is constituted by the shaft member, the housing, and the seal member. With a bearing structure in which the positional relationship among the shaft member, the housing, and the seal member is different from that in the bearing structure 10 according to the above-described example, as in the bearing structure 20 according to the first modification, advantages similar to those in the above-described example can be exhibited.

3.2. Second Modification

Figure 8:
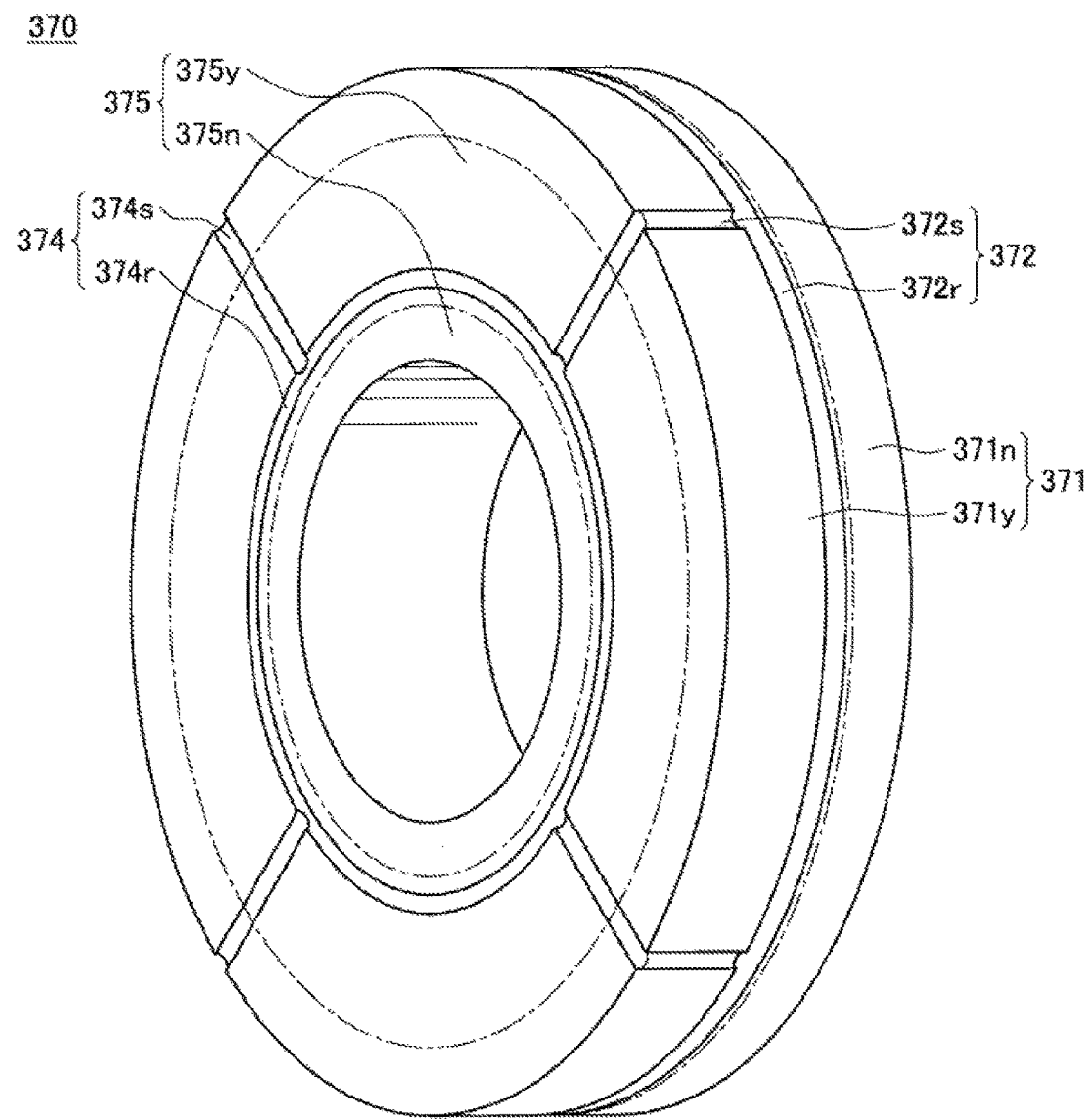
FIG. 8 is a perspective view illustrating a seal member according to a second modification.
Figure 9:
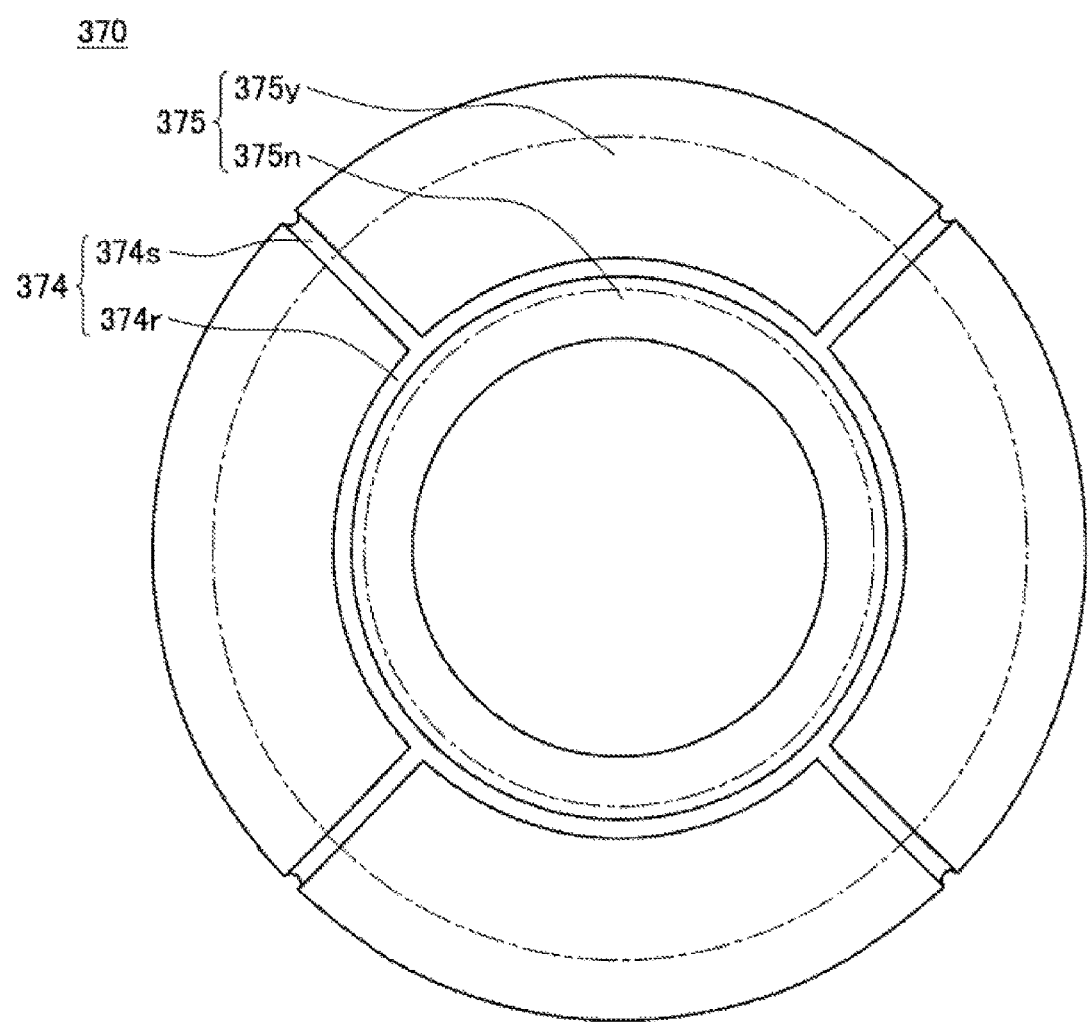
FIG. 9 is a front view of the seal member according to the second modification.
Figure 10:
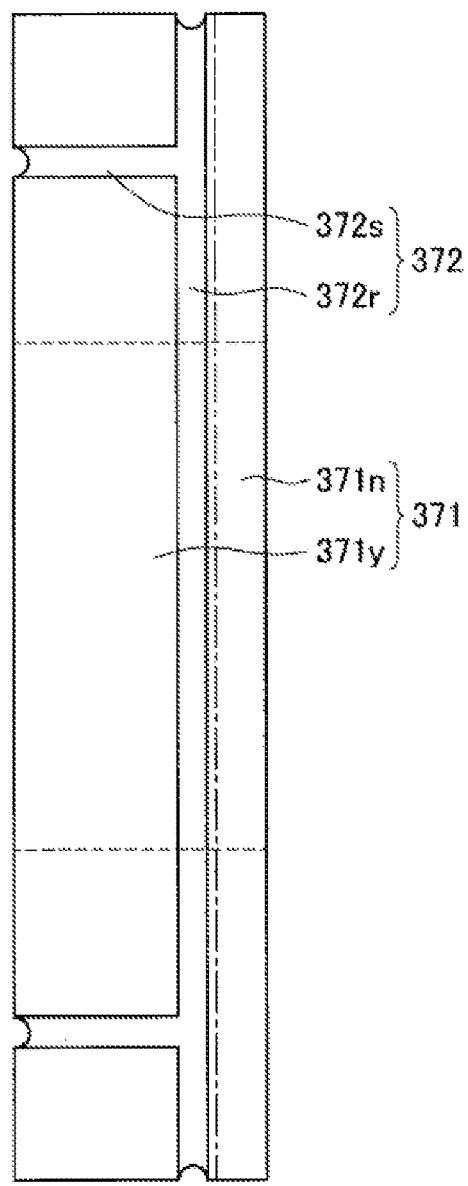
FIG. 10 is a side view of the seal member according to the second modification.

Next, a second modification will be described with reference to FIGS. 8 to 10. FIG. 8 is a perspective view illustrating a seal member 370 according to a second modification. Specifically, FIG. 8 is a perspective view of the seal member 370 as viewed from the first side thereof. FIG. 9 is a front view of the seal member 370 according to the second modification. Specifically, FIG. 9 is a front view of the seal member 370 as viewed from the first side thereof. FIG. 10 is a side view of the seal member 370 according to the second modification as viewed from the first side thereof.

In the second modification, the configuration of the seal member is different from that in the example described with reference to FIGS. 1 to 5. Specifically, in the seal member 370 according to the second modification, the shape of the guide groove is different from that in the seal member 170 according to the above-described example.

Similar to the seal member 170 according to the above-described example, the seal member 370 abuts on the shaft member 110 and the housing 150. Specifically, the seal member 370 abuts on the inner periphery of the shaft member 110 and the outer periphery of the protruding member 156 of the housing 150. More specifically, the outer peripheral surface of the seal member 370 abuts on the inner peripheral surface of the shaft member 110, and the end surface at the first side of the seal member 370 abuts on the side surface 156g at the first side of the annular groove 156d of the protruding member 156. The outer peripheral surface of the seal member 370 corresponds to an abutment portion 371 where the seal member 370 abuts on the shaft member 110. In the end surface at the first side of the seal member 370, an area that abuts on the side surface 156g at the first side of the annular groove 156d corresponds to an abutment portion 375 where the seal member 370 abuts on the housing 150.

Similar to the seal member 170 according to the above-described example, at least one of the abutment portion 371 where the seal member 370 according to the second modification abuts on the shaft member 110 and the abutment portion 375 where the seal member 370 abuts on the housing 150 has a guide groove. Specifically, the guide groove is formed at the external space side of the abutment portion of the seal member 370, and the oil passage side of the abutment portion of the seal member 370 is provided with a non-formation region where the guide groove is not formed.

More specifically, as illustrated in FIGS. 8 to 10, the first side of the abutment portion 371 abutting on the shaft member 110 is provided with a formation region 371y, and a guide groove 372 is formed in this formation region 371y. The second side of the abutment portion 371 abutting on the shaft member 110 is provided with a non-formation region 371n where the guide groove 372 is not formed. The outer peripheral side of the abutment portion 375 abutting on the housing 150 is provided with a formation region 375y, and a guide groove 374 is formed in this formation region 375y. The inner peripheral side of the abutment portion 375 abutting on the housing 150 is provided with a non-formation region 375n where the guide groove 374 is not formed. In FIGS. 8 to 10, the formation regions and the non-formation regions are indicated by single-dot chain lines.

Each guide groove formed in the seal member 370 according to the second modification includes an annular groove formed at the oil passage side of the formation region and a communication groove that allows spatial communication between the annular groove and the end at the external space side of the formation region.

Specifically, as illustrated in FIGS. 8 and 10, the guide groove 372 formed in the formation region 371y of the abutment portion 371 abutting on the shaft member 110 includes an annular groove 372r and a communication groove 372s. The annular groove 372r is formed at the second side of the formation region 371y. The communication groove 372s allows spatial communication between the annular groove 372r and the end at the first side of the formation region 371y. For instance, a plurality of communication grooves 372s are disposed at equal intervals in the circumferential direction.

Furthermore, as illustrated in FIGS. 8 and 9, the guide groove 374 formed in the formation region 375y of the abutment portion 375 abutting on the housing 150 includes an annular groove 374r and a communication groove 374s. The annular groove 374r is formed at the inner peripheral side of the formation region 375y. The communication groove 374s extends from the annular groove 374r to the outer periphery of the end surface at the first side of the seal member 370. For instance, a plurality of communication grooves 374s are disposed at equal intervals in the circumferential direction. In the end surface at the first side of the seal member 370, the communication groove 374s does not have to be formed at the outer peripheral side of the abutment portion 375. Furthermore, although the communication groove 372s of the guide groove 372 and the communication groove 374s of the guide groove 374 are coupled to each other at the outer periphery of the end surface at the first side of the seal member 370 in FIG. 8, the communication groove 372s and the communication groove 374s do not have to be coupled to each other.

The guide groove 372 and the guide groove 374 according to the second modification described above are formed in the formation regions of the abutment portions by allowing the end at the oil passage side and the end at the external space side to spatially communicate with each other. In the abutment portions of the seal member 370, the guide groove 372 and the guide groove 374 are disposed between the end at the oil passage side and the end at the external space side at the respective positions in the circumferential direction.

Similar to the seal member 170 according to the above-described example, the seal member 370 according to the second modification has electrical conductivity. Thus, electrical conduction can be achieved between the shaft member 110 to which the inner rings 131 are fitted and the housing 150 to which the outer rings 132 are fitted, whereby electrolytic corrosion can be prevented from occurring in the bearings 130.

In the seal member 370 according to the second modification, at least one of the abutment portion 371 abutting on the shaft member 110 or the abutment portion 375 abutting on the housing 150 has a guide groove that guides the oil entering the abutment portions from the oil passage to the external space of the oil passage, similar to the seal member 170 according to the above-described example. Thus, even if the oil enters the abutment portions, the oil can be prevented from intervening between the seal member 370 and either one of the shaft member 110 and the housing 150. This can prevent the contact area between the seal member 370 and either one of the shaft member 110 and the housing 150 from decreasing, so that stable electrical conduction between the shaft member 110 and the housing 150 can be ensured. Consequently, according to the second modification, electrolytic corrosion can be effectively prevented from occurring in the bearings 130, similar to the above-described example.

As described above, the shape of the guide groove formed in the seal member is not limited to the shape of the guide groove formed in the seal member 170 according to the above-described example. Specifically, the guide groove may have a different shape so long as the guide groove can guide the oil entering the abutment portions from the oil passage to the external space. With a seal member having a guide groove with a shape different from that of the guide groove formed in the seal member 170 according to the above-described example, as in the seal member 370 according to the second modification, advantages similar to those in the above-described example can be exhibited.

4. Conclusion

As described above, in this example, the seal member 170 that abuts on the shaft member 110 and the housing 150 is provided between the shaft member 110 and the housing 150. Furthermore, an oil passage is constituted by the shaft member 110, the housing 150, and the seal member 170. Moreover, the seal member 170 has electrical conductivity. Thus, electrical conduction can be achieved between the shaft member 110 to which the inner rings 131 are fitted and the housing 150 to which the outer rings 132 are fitted. This can prevent an increase in the potential difference between the inner rings 131 and the outer rings 132, so that excessive electric current can be prevented from flowing between the inner rings 131 and the outer rings 132. Consequently, electrolytic corrosion can be prevented from occurring in the bearings 130.

Furthermore, in the seal member 170 according to this example, at least one of the abutment portion abutting on the shaft member 110 or the abutment portion abutting on the housing 150 has a guide groove that guides the oil entering the abutment portion from the oil passage to the external space of the oil passage. Thus, even if the oil enters the abutment portion, the oil is effectively prevented from intervening between the seal member 170 and either one of the shaft member 110 and the housing 150. This can prevent the contact area between the seal member 170 and either one of the shaft member 110 and the housing 150 from decreasing, so that stable electrical conduction between the shaft member 110 and the housing 150 can be ensured. Consequently, according to this example, electrolytic corrosion can be effectively prevented from occurring in the bearings 130.

As an alternative to the above description in which the shaft member 110 is directly coupled to the motor 80, the shaft member 110 may be indirectly coupled to the motor 80.

For instance, the shaft member 110 may be coupled to an output shaft of the motor 80 via a mechanical component, such as a gear or a clutch. In such a case, the motor 80 may be accommodated in a casing different from the housing 150. Even in the case where the shaft member 110 is indirectly coupled to the motor 80, a potential difference may occur between the inner rings 131 and the outer rings 132 of the bearings 130 that rotatably support the shaft member 110 in accordance with driving of the motor 80. Thus, by applying the example of the present invention to a bearing structure, advantages similar to the above-described example can be exhibited.

As an alternative to the above description in which the oil passage is coupled to the end of the inner peripheral space 114 or 214 of the shaft member 110 or 210 such that the oil is introduced to the end of the inner peripheral space 114 or 214 of the shaft member 110 or 210 from the housing side, the route of the oil passage is not limited to that described in the example. For instance, the inlet passage through which oil delivered from an oil pan travels may be coupled to the inner peripheral surface of the housing. The oil that has traveled through the inlet passage may be delivered to the inner space of the housing from the opening in the inner peripheral surface of the housing and be introduced to the inner peripheral space of the shaft member via an inlet communication passage that allows spatial communication between the inner peripheral side and the outer peripheral side of the shaft member. In such a case, the seal member is provided in abutment with the outer periphery of the shaft member and the inner periphery of the housing. Specifically, the seal member may be provided at each of the first side and the second side of the aforementioned opening in the inner peripheral surface of the housing as well as an opening at the outer peripheral side of the inlet communication passage of the shaft member.

As an alternative to the above description in which the bearing structure includes the pair of bearings 130a and 130b, the bearing structure may include an additional bearing different from the bearings 130a and 130b, and the shaft member may be rotatably supported by the additional bearing.

Although the components of the bearing structure have been described above with reference to the drawings, the shapes of the components are not limited to those in the drawings, and the shapes illustrated in the drawings are merely examples. For instance, the shape of each component does not have to be symmetrical in the axial direction and does not have to be rotationally symmetrical with respect to the central axis. Moreover, each component may be formed of a plurality of members.

Although a preferred example of the present invention has been described above with reference to the appended drawings, the present invention is not limited to the example. It is obvious to a person with a common knowledge of the technical field to which the example of the present invention pertains that various modifications and applications are conceivable within the technical scope described in the claims, and it is to be understood that such modifications and applications belong to the technical scope of the present invention.

The invention claimed is:

1. A bearing structure comprising:
a shaft member coupled to a motor;
a pair of bearings disposed around the shaft member with a distance between the bearings in an axial direction;
a housing rotatable relative to the shaft member by means of the pair of bearings; and
an electrically-conductive seal member provided between the shaft member and the housing and abutting on the shaft member and the housing,
wherein inner rings of the bearings are fitted to an outer peripheral surface of the shaft member,
wherein outer rings of the bearings are fitted to an inner peripheral surface of the housing,
wherein the shaft member, the housing, and the seal member constitute an oil passage, and
wherein at least one of an abutment portion where the seal member abuts on the shaft member or an abutment portion where the seal member abuts on the housing has a guide groove configured to guide oil entering the abutment portion from the oil passage to an external space of the oil passage.

2. The bearing structure according to claim 1,
wherein the guide groove is formed at the external space side of the abutment portion of the seal member, and
wherein the oil passage side of the abutment portion of the seal member is provided with a non-formation region where the guide groove is not formed.

3. The bearing structure according to claim 2,
wherein, in a region where the guide groove is formed in the abutment portion, the guide groove is formed to allow spatial communication between an end at the oil passage side and an end at the external space side.

4. The bearing structure according to claim 2,
wherein the seal member is ring-shaped, and
wherein, in the abutment portion of the seal member, the guide groove is disposed at each position in a circumferential direction between an end at the oil passage side and an end at the external space side.

5. The bearing structure according to claim 2,
wherein the shaft member is substantially cylindrical, and
wherein the oil passage has an inner peripheral space of the shaft member.

6. The bearing structure according to claim 5,
wherein the housing comprises an inner facing member that faces an inner periphery of the shaft member with a gap therebetween, and
wherein the seal member abuts on the inner periphery of the shaft member and an outer periphery of the inner facing member.

7. The bearing structure according to claim 5,
wherein the housing comprises an outer facing member that faces an outer periphery of the shaft member with a gap therebetween, and
wherein the seal member abuts on the outer periphery of the shaft member and an inner periphery of the outer facing member.

8. The bearing structure according to claim 2,
wherein the seal member has abrasion resistance.

9. The bearing structure according to claim 2,
wherein the seal member has oil resistance.

10. The bearing structure according to claim 2,
wherein a rotor of the motor is coupled to the shaft member such that the rotor is rotatable together with the shaft member.

11. The bearing structure according to claim 1,
wherein the seal member is ring-shaped, and
wherein, in the abutment portion of the seal member, the guide groove is disposed at each position in a circumferential direction between an end at the oil passage side and an end at the external space side.

12. The bearing structure according to claim 1,
wherein the shaft member is substantially cylindrical, and
wherein the oil passage has an inner peripheral space of the shaft member.

13. The bearing structure according to claim 12,
wherein the housing comprises an inner facing member that faces an inner periphery of the shaft member with a gap therebetween, and
wherein the seal member abuts on the inner periphery of the shaft member and an outer periphery of the inner facing member.

14. The bearing structure according to claim 12,
wherein the housing comprises an outer facing member that faces an outer periphery of the shaft member with a gap therebetween, and
wherein the seal member abuts on the outer periphery of the shaft member and an inner periphery of the outer facing member.

15. The bearing structure according to claim 1,
wherein the seal member has abrasion resistance.

16. The bearing structure according to claim 1,
wherein the seal member has oil resistance.

17. The bearing structure according to claim 1,
wherein a rotor of the motor is coupled to the shaft member such that the rotor is rotatable together with the shaft member.

* * * * *